United States Patent [19]
Soni

[11] Patent Number: 4,940,179
[45] Date of Patent: Jul. 10, 1990

[54] DEVICE FOR FORMING A SOLDER CONNECTION

[75] Inventor: Pravin Soni, Union City, Calif.

[73] Assignee: Raychem Corporation, Menlo Park, Calif.

[21] Appl. No.: 368,756

[22] Filed: Jun. 20, 1989

[51] Int. Cl.⁵ .......................... H01R 4/70; B23K 3/00
[52] U.S. Cl. .................. 228/56.3; 174/84 R; 174/DIG. 8
[58] Field of Search ............... 228/56.3, 175; 156/49, 156/90, 158; 174/84 R, DIG. 8

[56] References Cited

U.S. PATENT DOCUMENTS

| | | | |
|---|---|---|---|
| 3,525,799 | 8/1970 | Ellis | 228/56.3 |
| 3,578,896 | 5/1971 | Lynch | 228/56.3 |
| 4,144,404 | 3/1979 | DeGroef et al. | 228/56.3 |
| 4,722,471 | 2/1988 | Gray et al. | 228/56.3 |
| 4,832,248 | 5/1989 | Soni et al. | 228/56.3 |

Primary Examiner—Nicholas P. Godici
Assistant Examiner—Samuel M. Heinrich
Attorney, Agent, or Firm—Edith A. Rice; Yuan Chao; Herbert Burkard

[57] ABSTRACT

A device for connecting two bodies such as wires, and for sealing the connection between them, comprising a heat-shrinkable sleeve, a solder insert and an annular composite adhesive insert which comprises two layers of heat-activatable adhesive material. The viscosity of the radially inner layer is less than that of the outer layer. The device is heated to cause the sleeve to shrink and to cause the solder to fuse to form a connection between the bodies. Flow of the inner, less viscous layer of the adhesive insert is restricted by the outer viscous layer, to minimize contamination of the solder by the material of the inner layer.

14 Claims, 2 Drawing Sheets

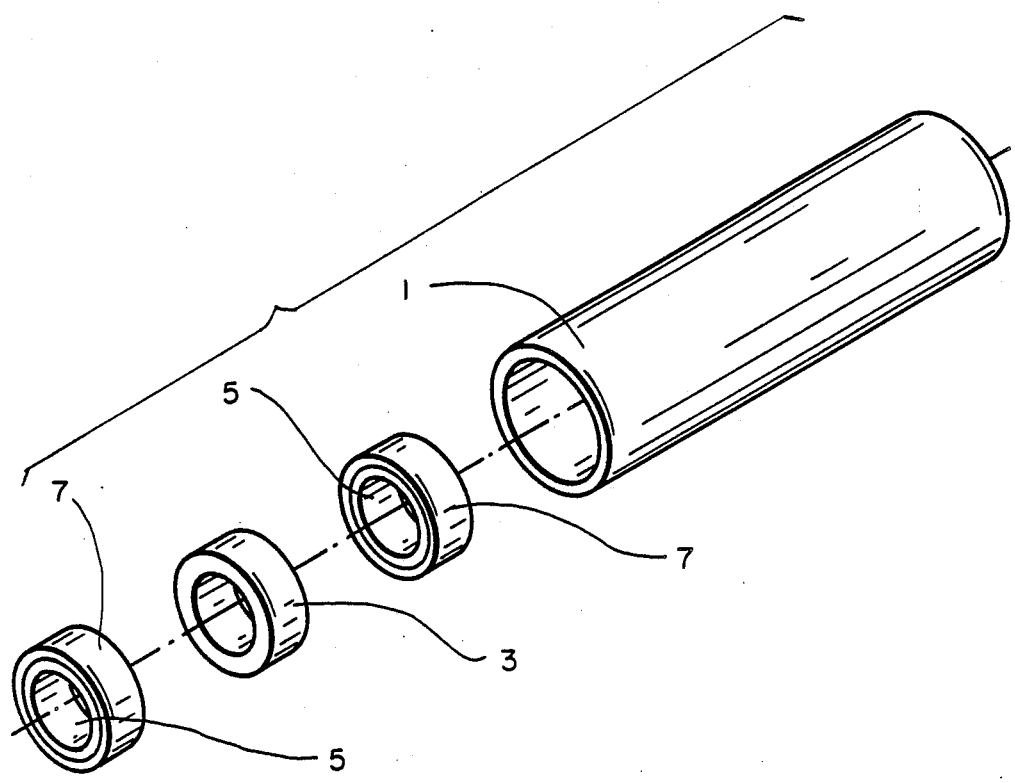
FIG_1

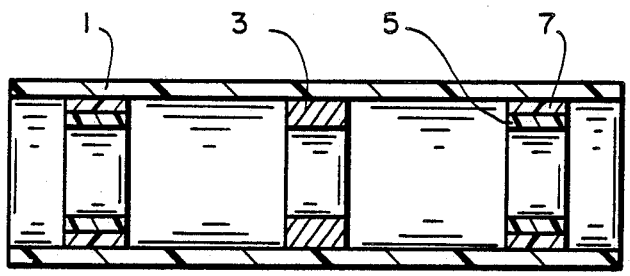
FIG_2
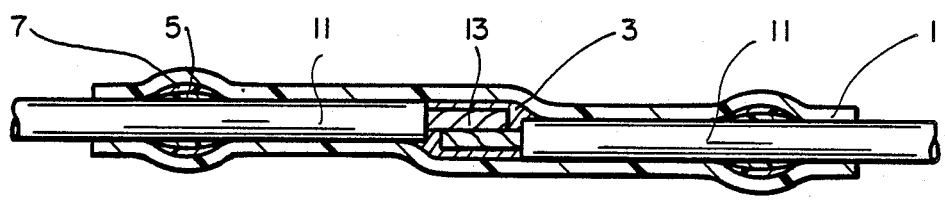
FIG_3
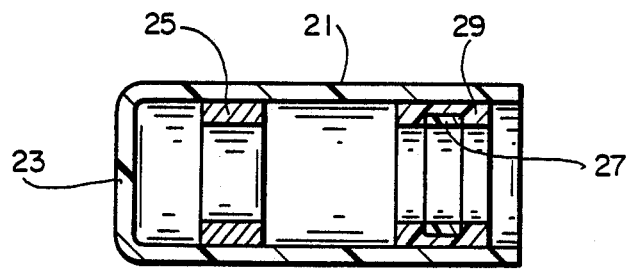
FIG_4

DEVICE FOR FORMING A SOLDER CONNECTION

This invention relates to a device for forming a solder connection between a plurality of bodies. The bodies may be, for example, electrical conductors such as wires, or pipes or tubes.

A solder connection between bodies may be made by means of a device containing a heat-shrinkable sleeve containing a solder preform. A heat-shrinkable article is one which may be made to shrink significantly when subjected to heat treatment. Usually such articles shrink when heated towards an original shape from which they have previously been deformed but the term "heat-shrinkable", as used herein, is also applicable to an article which, on heating, adopts a new configuration, even if it has not been previously deformed.

Connection devices comprising heat-shrinkable sleeves which contain solder inserts are disclosed in, for example, U.S. Pat. No. 3,243,211, U.S. Pat. No. 4,286,396 and U.S. Pat. No. 4,144,404, and are sold by Raychem Corporation of Menlo Park, Calif. under the trademark "SOLDER SLEEVE" amongst others. Such devices generally include one or more inserts of a heat-activatable adhesive material, such as a hot-melt adhesive, for forming a seal between the sleeve and one or more of the bodies to or between which the connection is made. It is generally important that the adhesive material does not contaminate the solder which is used to make the connection since such contamination can affect adversely the mechanical or electrical characteristics (or both) of the connection. This can be achieved by selecting an adhesive material which does not tend to flow significantly when the sleeve is heated to cause it to shrink. The tendency of an adhesive material to flow when heated can be reduced by crosslinking it.

Contamination of the solder by the adhesive material can also be reduced or eliminated by restricting flow of the adhesive material when heated. U.S. Pat. No. 4,832,248 discloses a device for forming a solder connection between elongate bodies, which comprises a hollow, heat-shrinkable sleeve containing a solder insert and first and second heatactivatable adhesive inserts. The viscosity of the second insert is higher than that of the first insert, and it is positioned coaxially with respect to the first insert and longitudinally spaced apart from it, so that the second insert restricts flow of the material of the first insert when the sleeve is heated to cause it to shrink. The subject matter disclosed in the above-mentioned patent application is incorporated herein by this reference to it.

The disclosed device has the disadvantage that the first insert can be difficult to handle when its viscosity is particularly low. A low viscosity can be required in some instances to form a seal to certain materials, for example to polymeric materials having a low surface energy such as certain fluoropolymers for example an ethylene tetrafluoroethylene copolymer.

I have devised a solder connection device which includes a composite adhesive insert comprising two layers. The material of one of the layers has a higher viscosity than that of the other layer, and is able to support the other layer and to restrict flow of the material of the other layer when heated.

Accordingly, the invention provides a device for forming a solder connection between a plurality of bodies, which comprises:

(a) a hollow, dimensionally heat-shrinkable sleeve;
(b) a solder preform positioned within the sleeve; and
(c) an annular composite adhesive insert positioned coaxially within the sleeve and comprising two layers of heat-activatable adhesive material, the viscosity of the radially inner layer being less than that of the outer layer at the temperature to which the sleeve is heated to cause it to shrink, the arrangement and the relative viscosities of the materials of the two layers being such that the outer layer restricts flow of the material of the inner layer when the sleeve is so heated.

The ability of the radially outer layer of the adhesive insert to restrict flow of the material of the inner layer, while not affecting significantly the ability of the adhesive insert to form a seal to a body positioned within the sleeve is surprising and represents a significant advantage. It allows a material to be used for the inner layer whose viscosity is so low that it is difficult to handle unless it is supported, and such a support can be provided by the outer layer. The composite insert can therefore be used to form a seal to bodies whose surfaces have a low surface energy, such as to electrical wires having a polyethylene tetrafluoroethylene copolymer insulation or to polytetrafluoroethylene pipes or tubes.

Furthermore, the use of a composite adhesive insert allows the advantages of two adhesive materials to be obtained in a single insert, which can be manufactured conveniently, for example by extrusion as discussed below. This facilitates assembly of the solder connection device.

The composite insert can provide subsidiary functions by addition of appropriate additives to the materials of one or both of the inner and outer layers. An advantage of the use of a composite insert is that different functions can be provided by the two layers by appropriate formulation. For example, a filler, which could have flame retarding properties, might be added to the material of the outer layer, making it more viscous, while the inner layer retains low viscosity, facilitating the formation of a seal to the body inserted into the sleeve.

The composite insert may be formed by applying a coating of the material of one of the layers onto the other of the layers. Preferably, however, the composite insert is formed by coaxial coextrusion of the materials of the inner and outer layers.

The adhesive materials of the composite insert may comprise, for example, a fluorinated polymer such as polyvinylidene fluoride, an olefin homo- or copolymer such as polyethylene, an ethylene vinylacetate copolymer, a polyamide, or a blend thereof, particularly an ethylene vinyl acetate containing polyvinylidene fluoride. The materials of the two layers may comprise the same basic chemical compositions or they may comprise different compositions. For example, they may both be blends of the same two or more polymers, but in different proportions such that different viscosities result. They may contain different or different amounts of some filler. They may have different molecular weights due to different degrees of polymerization, or they may be crosslinked to different extents, by which terms we include a preferred arrangement wherein the first adhesive is non-crosslinked and the second is crosslinked. Crosslinking is preferably by electron beam radiation, and a suitable dose is from 1 to 30 megarads, especially from 15 to 25 megarads. It has been found that such crosslinking provides a further significant benefit, especially in conjunction with wires or other bodies having a low surface energy, in that the crosslinking helps to retain the adhesive in good contact with and adhesion to the surface.

A different degree of crosslinking between the inner and outer layers of the composite insert may arise from uniform exposure to radiation but localized addition of agents which enhance or diminish the crosslinking effect of the irradiation, or from the use of low penetration radiation. Alternatively, the part of the insert that is to become the inner layer could be shielded from the irradiation. A preferred adhesive composition comprises a blend of (a) ethylene vinylacetate, (b) polyvinylidene fluoride and (c) a copolymer of vinylidene fluoride and tetrafluoroethylene and/or hexafluoropropylene, each being present as 25 to 40% by weight of the total, and preferably in substantially equal amounts by weight. A blend such as this may exhibit more than one melting point; the melting point that is relevant is the one that most affects the bulk flow of the material. The blend mentioned will melt primarily at about 90° C., but there will be some further melting (due to a dispersed phase) at about 170° C.

The extent to which it is necessary to restrict the flow of the material of the inner layer of the composite insert will depend on the configuration of the device, in particular on the distance between the solder preform and the composite insert, the general requirement being that the material of the inner layer of the insert should not flow to the extent that it contaminates the material of the solder preform when molten.

The extent to which the outer layer of the composite insert restricts flow of the material of the inner layer will depend on a number of factors, including the configurations of the two layers, the amount of material in each of the two layers and the relative viscosities of the materials of the two layers at the temperature to which the device is heated during installation.

Preferably, the axial length of the inner layer is not greater than that of the outer layer, so that the inner layer does not extend axially beyond either end of the outer layer. Generally the axial lengths of the inner and outer layers of the composite insert will be approximately equal.

Preferably, the ratio of the thickness of the inner layer to that of the outer layer is from about 0.25 to about 4.0. More preferably, the value of the said ratio is at least about 0.5, especially at least about 1.0, or less than about 2.5, or both.

Preferably, the ratio of the viscosity of the material of the inner layer to that of the outer layer is from about 0.1 to about 0.8. More preferably, the value of the said ratio is at least about 0.2, or less than about 0.5, or both.

Additional control over the flow of the material of the inner layer of the composite insert may be provided by a further annular insert of heat-activatable adhesive material which is positioned within the sleeve coaxially with the composite insert, the viscosity of the material of the further insert being greater than that of the radially inner layer of the composite insert at the temperature to which the sleeve is heated to cause it to shrink, the further insert restricting axial flow of the material of the inner layer of the composite insert when the sleeve is so heated. Two of the said further inserts may be provided positioned coaxially with the composite insert, one on each side thereof. The or each further insert and the composite insert may be provided as parts of an integral adhesive insert.

In order to form a solder connection between a plurality of bodies by means of the device according to the invention, the bodies are introduced into the appropriate position with in the device and the device is heated to melt the solder insert, the first and second adhesive inserts, and to recover the article about the bodies.

The events that should occur during installation of the device are complex, and it is a far from trivial problem to ensure that the correct events occur in the correct order. The device is intended to provide a highly reliable electrical (or other) connection that must last for many years under unfavorable conditions. Such unfavorable conditions may include wet and corrosive environments and severe mechanical strain. The adhesive insert must provide an environmental seal and in general must provide strain relief under these exacting conditions.

It is believed that, in general, the following events must occur, on heat installation. Firstly, the sleeve begins to shrink but a complete seal is not made at this stage. Then the solder preform melts, and as the sleeve shrinks, air within it will be driven out. As the sleeve recovers further and all the necessary air is expelled the inner layer of the adhesive insert flows and makes a desired seal but its flow is restricted by the high viscosity material of the outer layer of the adhesive insert. The heating is then stopped, and the device is allowed to cool. The solder solidifies, the materials of the inner and outer layers of the adhesive insert harden. From this sequence of events, the skilled person will be able to select suitable combinations of sleeve, solder, and adhesive insert. In general the various relevant temperatures are preferably in the following ascending order: sleeve recovery temperature; inner layer adhesive material melt temperature; solder melt temperature; outer layer adhesive material melt temperature. The adhesive materials need not melt but may merely soften, and of course the outer layer adhesive material may begin to soften at any temperature so long as it retains sufficiently high viscosity.

The recovery temperature of the sleeve is preferably from about 100° to about 350° C., especially from about 170° to about 300° C.

The first adhesive preferably melts between about 70° to about 180° C., especially about 80° to about 100° C.

The second adhesive preferably has a higher viscosity than the first adhesive over the range of from about 80° to about 200° C.

The melting point of the solder is preferably from about 140° to about 210° C., especially from about 170° to about 190° C., particularly about 184° C.

The term "solder" as used herein includes both conventional metallic solder and solder adhesives in which a hot-melt adhesive, e.g. a polyamide hot-melt adhesive, or a thermosetting adhesive such as an epoxy adhesive, is filled with metal particles, e.g. with silver flake. In most cases, however, the solder insert will be formed from conventional metallic solder. If desired, two or more solder inserts, having the same or different properties, may be provided.

The solder may comprise any suitable composition, which may be a eutectic composition such as 63% Sn/37% Pb or 96% Sn/4% Ag, or a non-eutectic composition such as 50% Sn/50% Pb.

Suitable materials for the heat-recoverable sleeve include alkene homo- or copolymers, which may be halogenated. Preferred materials include polyvinylidene fluoride, polyethylene tetrafluoroethylene copolymer and polyethylene. Such materials may be crosslinked.

The device may be formed in the form of a simple open-ended sleeve, each end of which is intended to receive one of the bodies to be connected. The dimensions of the sleeve may be substantially uniform, or one end may be larger than the other in order to accommodate a relatively large body. The device may be of any suitable size and is preferably from 0.5 to 5.0 cm in length and 0.2 to 3.0 cm in diameter. This may for example be the case where two pipes are intended to be joined, one pipe being larger than the other in order to receive the other therein. Alternatively the heatrecoverable article may be in the form of a cap, for example for forming a stub joint between a number of electrical conductors all of which are inserted into one open-end of the device. In another form of device which provides a composite connector, the article may have a metal connection element, e.g. a short piece of braid in the case of a coaxial cable connector. The solder insert is preferably positioned in the article substantially midway between its open ends, and the first and second adhesive inserts are preferably positioned adjacent each of the open ends. Yet another form of device may be a multiple connector in which an array of hollow articles has been formed by bonding together a pair of superimposed webs of polymeric material at spaced apart intervals and then crosslinked, form example as described in GB-A-No. 2084505.

The solder insert may have any of a number of configurations and may be located concentrically or eccentrically within the article. Preferably, however, the insert is arranged to extend around at least one of the bodies to be inserted, and is preferably therefore in the form of a ring arranged substantially coaxially within the article.

Although this is not necessary, it may be desirable to provide the device with a temperature indicator, for example a thermochromic material, in order to indicate when sufficient heat has been applied. Preferably this indicator is contained in a flux used with the solder insert. Thermochromic indicators are disclosed in GB-A-No. 2109418.

If desired one or more conductors (or other bodies) may be pre-installed in the article, e.g. as described in U.S. Pat. No. 4060887 and GB No. 1599520, so that, in some cases, only a single conductor need be inserted in the device when the connection is made.

The invention will now be described by way of example with reference to the accompanying drawings, in which:

FIG. 1 is an exploded isometric view of a device of the present invention, before assembly of the various components thereof;

FIG. 2 is a sectional elevation of the device shown in FIG. 1, after assembly;

FIG. 3 is a sectional elevation of the device shown in FIG. 2, in use to interconnect two wires; and FIG. 4 is a sectional view of a device of the present invention in the form of an end cap.

Referring to the drawings, FIGS. 1 and 2 show a device which comprises a heat-shrinkable sleeve 1 having two open ends and being formed from polyvinylidence fluoride. The device includes a solder preform 3 which is positioned at about the midpoint of the sleeve, and two composite adhesive inserts, each having an inner layer 5 and an outer layer 7. The inserts are positioned towards respective ends of the sleeve.

The viscosity of the material of the inner layer 5 of adhesive is arranged to be less than that of the outer layer 7.

The device is assembled by positioning the solder preform 3 and the inserts within the sleeve 1 and heating the sleeve to cause it to shrink so that it engages the preform and the inserts. Shrinkage of the sleeve may be controlled by positioning the preform and the inserts on a mandrel, and shrinking the sleeve over the mandrel.

FIG. 3 shows the device used to connect two wires 11. The wires are inserted into the sleeve 1, one from each end, so that the stripped conductors 13 of the wires overlap in the region of the solder preform 3. They may be positioned so that they are bridged by the solder preform. The device is heated to cause the sleeve 1 to shrink and the solder of the preform 3 to melt and to flow over the conductors 13.

As the sleeve is heated, the material of the inner layers 5 of the adhesive inserts melts, and is caused to flow onto the surface of the wires 11. The extent to which the material flows axially within the sleeve is restricted by the outer layers 7 of the adhesive inserts, so that the material does not contaminate the solder of the preform 3 when molten.

FIG. 4 shows a device in the form of an end cap. It comprises a sleeve 21 having a closed end 23. A solder preform 25 is positioned towards the closed end, A composite adhesive insert 27, having inner and outer layers of adhesive materials, is positioned towards the other end of the sleeve. Further annular inserts 29 are provided, one on each side of the composite insert 27, to restrict the flow of the material of the inner layer of the composite insert 29. The annular inserts and the outer layer of the composite insert may be formed from the same material. The annular inserts may be formed as a single body with the outer layer of the composite insert, for example in an appropriate mold.

EXAMPLE

Two adhesive materials were blended from the following constituents (percentages given by weight):

| CONSTITUENT | MATERIAL | |
| --- | --- | --- |
| | A | B |
| Polyvinylidene fluoride | 0 | 20 |
| Elastomeric fluoropolymers | 42 | 34 |
| Ethylene-vinyl acetate copolymers | 31 | 43 |
| Pigments | 4 | 3 |
| Tackifier | 23 | 0 |

The viscosities of the two materials were measured in a Rheometric Mechanical Spectrometer at a frequency of 10 Radians per second at 200° C., and were found to be 8000 poise and 28000 poise respectively.

A tubular composite adhesive insert was formed by coextrusion of materials A and B. The internal diameter of the insert was about 7.1 mm. The outer layer was formed from material B and had a thickness of about 0.25 mm, and the inner layer was formed from material A and had a thickness of about 0.38 mm.

The composite insert and a solder insert (formed from an alloy of 63% by weight tin and 37% by weight lead) were positioned within a heat-shrinkable sleeve of polyvinylidene fluoride. The sleeve was treated so as to cause it to shrink partially so as to grip the composite and solder inserts.

For comparison a device was formed using an adhesive insert formed only from material A. The internal diameter of the insert was about 7.1 mm and the wall thickness was about 0.64 mm. The adhesive insert, together with a solder insert, was assembled within a polyvinylidene fluoride sleeve.

The two devices were installed on respective coaxial braided cables having a copper conductor and a non-crosslinked ethylene tetrafluoroethylene copolymer outer jacket. The devices were positioned so that the solder insert surrounded a portion of the cable from which the outer jacket had been removed, and so that the adhesive insert surrounded an adjacent portion of the jacket. When so positioned, the devices were heated by means of hot air, to cause the solder insert to melt and to wet the conductors, the adhesive inserts to flow and the sleeves to shrink.

On inspection of the installed sleeves, it was noticed that the flow of the material of the composite adhesive insert was significantly less than the material of the insert formed only from material A, which had flowed into the solder joint region of the sleeve, impairing the quality of the solder joint and its inspectability after installation.

The installed device using the composite adhesive insert was subjected to temperature and humidity cycling. The moisture resistance provided by the adhesive insert was then evaluated according to the relevant test described in MIL-S-83519. The device passed the test.

What is claimed is:

1. A device for forming a solder connection between a plurality of bodies, which comprises:
   (a) a hollow, dimensionally heat-shrinkable sleeve;
   (b) a solder preform positioned within the sleeve; and
   (c) an annular composite adhesive insert positioned coaxially within the sleeve and comprising two layers of heat-activatable adhesive material, the viscosity of the radially inner layer being less than that of the outer layer at the temperature to which the sleeve is heated to cause it to shrink, the arrangement and the relative viscosities of the materials of the two layers being such that the outer layer restricts flow of the material of the inner layer when the sleeve is so heated.

2. A device as claimed in claim 1, in which the inner layer of adhesive material comprises a hot-melt adhesive.

3. A device as claimed in claim 1, in which the outer layer of adhesive material comprises a hot-melt adhesive.

4. A device as claimed in claim 1, in which the ratio of the thickness of the inner layer of adhesive material to that of the outer layer is from about 0.25 to about 4.0.

5. A device as claimed in claim 4, in which the value of the said ratio is at least about 0.5.

6. A device as claimed in claim 4, in which the value of the said ratio is less than about 2.5.

7. A device as claimed in claim 1, in which the ratio of the viscosity of the inner layer of adhesive material to that of the outer layer of material is from about 0.1 to about 0.8.

8. A device as claimed in claim 1, which includes a further annular insert of heat-activatable adhesive material which is positioned within the sleeve coaxially with the composite insert, the viscosity of the of material of the further insert being greater than that of the radially inner layer of the composite insert at the temperature to which the sleeve is heated to cause it to shrink, the further insert restricting axial flow of the material of the inner layer of the composite insert when the sleeve is so heated.

9. A device as claimed in claim 8, in which two of the said further inserts are provided positioned coaxially with the composite insert, one on each side thereof.

10. A device as claimed in claim 8, in which the further insert and the composite insert are provided as parts of an integral adhesive insert.

11. A device as claimed in claim 1, in which the inner and outer layers of the composite insert each comprise a blend of polymers, the two blends comprising substantially the same polymers but in different proportions.

12. A device as claimed in claim 1, in which the inner and outer layers of the composite insert comprise substantially the same materials, the outer layer having been crosslinked to a greater extent than the inner layer.

13. A device as claimed in claim 1, in which the viscosity of the inner layer is less than that of the outer layer from about 90° C. to about 200° C.

14. A device as claimed in claim 1, in which the composite insert is formed by coaxial co-extrusion of the materials of the inner and outer layers thereof.

* * * * *